(12) United States Patent
Tabata et al.

(10) Patent No.: US 10,207,942 B2
(45) Date of Patent: Feb. 19, 2019

(54) SEAWATER PRETREATMENT DEVICE

(71) Applicant: MITSUBISHI HEAVY INDUSTRIES, LTD., Tokyo (JP)

(72) Inventors: Masayuki Tabata, Tokyo (JP); Yoshiaki Ito, Tokyo (JP); Katsunori Matsui, Tokyo (JP); Kiichi Tokunaga, Tokyo (JP); Hideo Iwahashi, Tokyo (JP)

(73) Assignee: MITSUBISHI HEAVY INDUSTRIES ENGINEERING, LTD., Yokohama-shi (JP)

( * ) Notice: Subject to any disclaimer, the term of this patent is extended or adjusted under 35 U.S.C. 154(b) by 207 days.

(21) Appl. No.: 15/106,495

(22) PCT Filed: Jul. 29, 2014

(86) PCT No.: PCT/JP2014/069894
§ 371 (c)(1),
(2) Date: Jun. 20, 2016

(87) PCT Pub. No.: WO2015/098164
PCT Pub. Date: Jul. 2, 2015

(65) Prior Publication Data
US 2016/0368796 A1    Dec. 22, 2016

(30) Foreign Application Priority Data

Dec. 24, 2013 (JP) .................................. 2013-265897

(51) Int. Cl.
*C02F 3/00* (2006.01)
*C02F 3/06* (2006.01)
(Continued)

(52) U.S. Cl.
CPC ............ *C02F 3/006* (2013.01); *B01D 24/007* (2013.01); *B01D 61/025* (2013.01); *B01D 61/04* (2013.01);
(Continued)

(58) Field of Classification Search
CPC .. C02F 3/006; C02F 1/004; C02F 3/06; C02F 3/104; C02F 3/121; C02F 3/1268;
(Continued)

(56) References Cited

U.S. PATENT DOCUMENTS

2012/0193287 A1    8/2012  Brouwer et al.
2013/0313190 A1*   11/2013 Levy .................... B01D 61/022
                                                        210/617
2014/0319031 A1*   10/2014 Kamimura ................ C02F 3/06
                                                        210/96.2

FOREIGN PATENT DOCUMENTS

EP    2496528 A1    9/2012
JP    11-19675 A    1/1999
(Continued)

OTHER PUBLICATIONS

Notification of Transmittal of Translation of International Preliminary Report on Patentability (Form PCT/IB/338) of International Application No. PCT/JP2014/069894, dated Jul. 7, 2016, with Forms PCT/IB/373, PCT/IB/338 and PCT/ISA/237. (13 pages).
(Continued)

*Primary Examiner* — Claire A Norris
(74) *Attorney, Agent, or Firm* — Westerman, Hattori, Daniels & Adrian, LLP (57) ABSTRACT

An object is to provide a pretreatment device of seawater capable of growing and maintaining a biofilm in a good state on each of a plurality of filters connected in series, by supplying nutrients appropriately to the filters. A pretreatment device of seawater is used in removing salt from the
(Continued)

seawater to obtain freshwater, and includes: a supply duct (21) through which the seawater is to be supplied; a plurality of filters (16) including a particulate filtering material and a biofilm; connecting tubes (23) which connect the plurality of filters in series; a plurality of bypass tubes (24) each of which connects corresponding one of the plurality of filters to the supply duct; and a plurality of regulating valves (26) each of which is disposed in corresponding one of the plurality of bypass tubes to regulate a flow rate.

8 Claims, 10 Drawing Sheets

(51) Int. Cl.
| | | |
|---|---|---|
| *B01D 61/02* | (2006.01) | |
| *B01D 61/12* | (2006.01) | |
| *B01D 61/58* | (2006.01) | |
| *C02F 3/12* | (2006.01) | |
| *C02F 1/00* | (2006.01) | |
| *C02F 3/10* | (2006.01) | |
| *B01D 24/00* | (2006.01) | |
| *B01D 61/04* | (2006.01) | |
| *C02F 103/08* | (2006.01) | |

(52) U.S. Cl.
CPC ............ *B01D 61/12* (2013.01); *B01D 61/58* (2013.01); *C02F 1/004* (2013.01); *C02F 3/06* (2013.01); *C02F 3/104* (2013.01); *C02F 3/121* (2013.01); *C02F 3/1268* (2013.01); *B01D 2311/04* (2013.01); *B01D 2311/06* (2013.01); *B01D 2311/24* (2013.01); *B01D 2311/2649* (2013.01); *B01D 2311/2688* (2013.01); *C02F 2103/08* (2013.01); *C02F 2201/005* (2013.01); *C02F 2209/001* (2013.01); *C02F 2209/003* (2013.01); *C02F 2209/006* (2013.01); *C02F 2209/18* (2013.01); *C02F 2209/20* (2013.01); *C02F 2209/22* (2013.01); *C02F 2301/043* (2013.01); *C02F 2303/14* (2013.01); *C02F 2303/20* (2013.01); *C02F 2305/06* (2013.01); *Y02A 20/131* (2018.01); *Y02W 10/15* (2015.05)

(58) Field of Classification Search
CPC .... B01D 24/007; B01D 61/025; B01D 61/04; B01D 61/12; B01D 61/58
USPC ......................................................... 210/614
See application file for complete search history.

(56) References Cited

FOREIGN PATENT DOCUMENTS

| | | |
|---|---|---|
| JP | 11-19689 A | 1/1999 |
| JP | 2002-263672 A | 9/2002 |
| JP | 2005-313152 A | 11/2005 |
| JP | 2013-111559 A | 6/2013 |
| JP | 2013-188690 A | 9/2013 |
| JP | 2013-202548 A | 10/2013 |
| WO | 2011/161329 A1 | 12/2011 |
| WO | 2013099306 A1 | 7/2013 |

OTHER PUBLICATIONS

International Search Report dated Oct. 28, 2014, issued in counterpart International Application No. PCT/JP2014/069894. (9 pages).
Office Action dated Jul. 28, 2016, issued in counterpart Japanese Patent Application No. 2013-265897. (3 pages).
Yasuhide Goda, "Present State of Sea Water Filtration Process in Salt Manurfacturing Plant", Bull. The Society of Sea Water Science, Japan, 63(6), 364-366, (Dec. 1, 2009).
Decision to grant a patent dated Jan. 6, 2017, issued in counterpart Japanese Application No. 2013-265897, with English translation. (6 pages).
Extended (Supplementary) European Search Report dated Oct. 25, 2016, issued in European Application No. 14873609.3 (9 pages).
Examination Report dated Jul. 6, 2017, issued in counterpart Australian Application No. 2014371809. (4 pages).
First Office Action dated Mar. 1, 2018, issued in counterpart European Application No. 14873609.3. (5 pages).
Office Action dated Mar. 27, 2018, issued in counterpart Singaporian Application No. 11201604616X. (7 pages).
Examination Report dated Feb. 5, 2018, issued in counterpart Australian Application No. 2014371809. (4 pages).

\* cited by examiner

SEAWATER PRETREATMENT DEVICE

TECHNICAL FIELD

The present invention is related to a technical field of a pretreatment device of seawater to be supplied to a device which removes salt from seawater or concentrates salt in seawater by membrane filtration to produce fresh water.

BACKGROUND ART

Fresh water is required for a wide range of application including industrial usage and daily-life usage, and the demand for fresh water is increasing. As a supply source of fresh water, an extensive seawater desalination system has been developed to utilize abundant seawater to produce freshwater. This type of seawater desalination system requires pretreatment for removing suspended solids and microbes, before separating salt from seawater with a filtering device such as a reverse osmosis membrane, a NF membrane, and an electrodialytic membrane.

Such pretreatment is typically performed by adding chemicals, including chlorine (Cl) as a sterilizer, ferric chloride ($FeCl_3$) as flocculant, and sulfuric acid ($H_2SO_4$) for pH control, for instance. However, use of chemicals in pretreatment leads to an increase in desalination cost including running cost. Accordingly, Patent Document 1, for instance, discloses a technique for avoiding use of chemicals and reducing running cost, by using a sand filter with a biofilm grown and maintained on a sand surface to remove particles contained in seawater as well as silt density index (SDI) components (e.g. particles and colloid) which contaminate a film surface and BOD components which cause biofouling.

Figure 11:
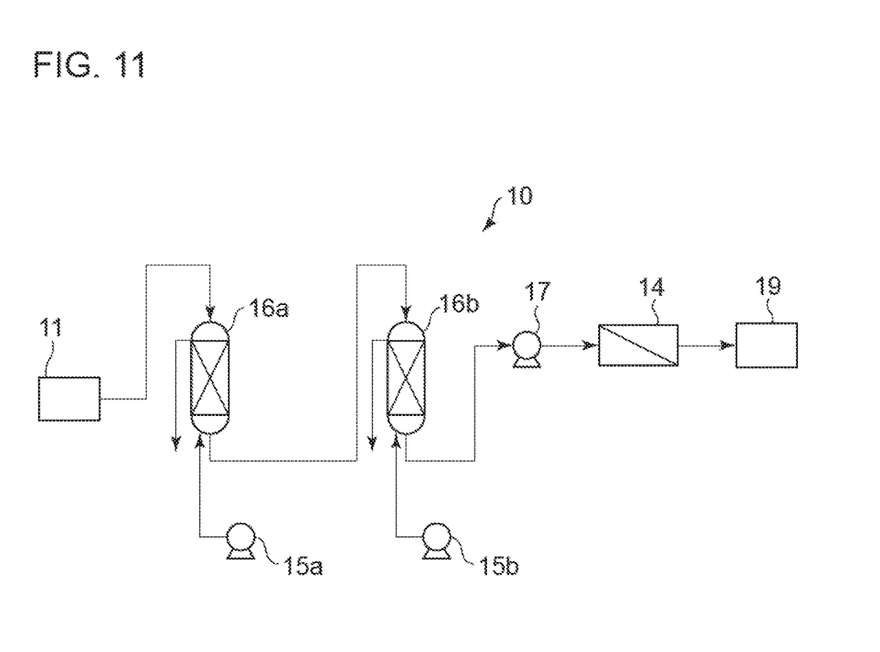
FIG. 11 is a schematic configuration diagram of a seawater pretreatment device of a background art.

FIG. 11 is a schematic configuration diagram of a seawater pretreatment device 10 disclosed in Patent Document 1. The pretreatment device 10 is a device for performing pretreatment before separating fresh water with a device 14 for removing or concentrating salt in seawater by membrane filtration, and includes a plurality of sand filters 16. Each sand filter 16 removes particles from seawater through sand 18 serving as a particle filtering material, and also removes SDI components and BOD components by using a biofilm 20 grown and maintained on the surface of the sand 18. Especially in Patent Document 1, a plurality of the sand filters 16 is prepared (primary sand filter 16a, secondary sand filter 16b), and connected in series to a flow channel of seawater.

Each sand filter 16 of the pretreatment device 10 is equipped with a back-cleaning pump 15 which performs reverse-current cleaning to clean a filtering material in case a differential pressure of the filter increases. Seawater having flowed through the pretreatment device 10 as described above is separated from concentrate seawater and desalinated by the device 14 for removing or concentrating salt in seawater by membrane filtration.

CITATION LIST

Patent Literature

Patent Document 1: JP2013-111559 A

SUMMARY

Problems to be Solved

Meanwhile, to grow and maintain microbes on the biofilms 20 of the sand filters 16, nutrients in seawater are required besides oxygen, including carbon (C), nitrogen (N), and phosphorus (P). As depicted in FIG. 11, if the sand filters 16 including the biofilm 20 are disposed in series with respect to a flow channel, the upstream primary sand filter 16a is supplied with sufficient nutrients, but the downstream secondary sand filter 15b is supplied with seawater whose nutrients have been consumed by the primary sand filter 16a, and thus nutrients required to grow and maintain the biofilm 20 may fall short, which may deteriorate filtering performance of the sand filters 16.

The present invention was made in view of the above, and an object is to provide a seawater pretreatment device capable of growing and maintaining a biofilm in a good state on each of a plurality of filters connected in series, by supplying nutrients suitably to the plurality of filters.

Solution to the Problems

A pretreatment device of seawater to be supplied to a device for removing salt from the seawater or concentrating the seawater by membrane filtration, according to an aspect of the present invention, comprises: a supply duct through which the seawater is to be supplied; a plurality of filters including a particulate filtering material which separates particles from the seawater supplied through the supply duct, and a biofilm formed on a surface of the particulate filtering material; a plurality of connecting tubes which connect the plurality of filters in series; a plurality of bypass tubes each of which connects corresponding one of the plurality of filters to the supply duct; and a plurality of regulating valves each of which is disposed in corresponding one of the plurality of bypass tubes to regulate a flow rate.

According to the present aspect, each of the plurality of filters connected in series to one another is connected to the supply duct via a bypass tube, and thereby it is possible to supply each filter with seawater containing sufficient nutrients in accordance with the opening degree of the regulating valve. Thus, it is possible to grow and maintain a biofilm in a good state even for the filter on the downstream side, where nutrients are likely to fall short.

The pretreatment device of seawater may further comprise: a water-quality detecting part disposed on an outlet section of at least one of the plurality of filters; and a valve control part configured to control opening degrees of the regulating valves on the basis of a detection value obtained by the water-quality detecting part.

According to the present aspect, the water-quality detecting part is disposed on the outlet section of the filters to determine the condition of the biofilm of the filter through the water quality, and the opening degrees of the regulating valves are adjusted in accordance with a detection result of the water-quality detecting part, and thereby it is possible to supply an appropriate amount of seawater from the supply duct via the bypass tubes.

In this case, the water-quality detecting part may be disposed on the outlet section of the filter disposed most downstream among the plurality of filters, and the valve control part may be configured to control the plurality of regulating valves to be closed in order from a downstream side, if the detection value obtained by the water-quality detecting part is greater than a first standard value set in advance after the valve control part controls the plurality of regulating valves to be open.

According to the present aspect, the water-detecting part is disposed on the outlet section of the filter on the most downstream position, and thereby it is possible to control the opening degrees of the regulating valves in accordance with the water quality of water finally discharged from the pretreatment device. Further, if deterioration of water quality is detected from the water detection value being greater than the first standard value and the regulating valves are to be closed, the regulating valves are closed from the downstream side, where the filters have larger influence on water quality of water of final production. In this way, each sand filter is supplied with sufficient nutrients while deterioration of water quality is suppressed, and thereby it is possible to grow and maintain the biofilm.

Further, the valve control part may be configured to control the plurality of regulating valves to be open, if the detection value obtained by the water-quality detecting part is not greater than a second standard value set in advance, the second standard value being smaller than the first standard value, after the valve control part controls the plurality of regulating valves to be closed.

According to the present aspect, if recovery of water quality is confirmed from the water-quality detection value being the second standard value or less after the regulating valve is closed to suppress deterioration of water quality in response to the water-quality detection value exceeding the first standard value, the regulating valve is opened to restart supply of seawater through the bypass tubes. Accordingly, it is possible to supply each sand filter with nutrients efficiently via the bypass tubes while avoiding deterioration of water quality of the filters.

The pretreatment device of seawater may further comprise: a nutrient detecting part configured to detect nutrients contained in supply water to be supplied to at least one of the plurality of filters; and a valve control part configured to control opening degrees of the regulating valves on the basis of a detection value obtained by the nutrient detecting part.

According to the present aspect, nutrients in seawater are detected at the inlet section of the filters, and the opening degrees of the regulating valves are controlled on the basis of a detection value of the nutrient detecting part. Accordingly, it is possible to control the supply amount from the bypass tubes so that necessary nutrients for growing and maintaining the biofilm are distributed to each filter.

In this case, the nutrient detecting part may be disposed on an inlet section of the plurality of filters, and the valve control part may be configured to control the opening degrees of the regulating valves so that a detection value of each nutrient detecting part is at least a predetermined standard value.

According to this aspect, each filter is provided with the nutrient detecting part, and nutrients supplied to each of the plurality of filters are detected to control the opening degrees of the regulating valves. Accordingly, it is possible to control the supply amount of seawater from the bypass tubes to each filter individually so that sufficient nutrients are supplied to each filter.

Further, the pretreatment device of seawater may further comprise: an activity-level detecting part disposed on at least one of the plurality of filters, and configured to detect an activity level of the biofilm of the at least one filter, and a valve control part configured to control opening degrees of the regulating valves on the basis of a detection value obtained by the activity-level detecting part. The valve control part may be configured to control the opening degrees of the regulating valves so that the detection value obtained by the activity-level detecting part is at least a predetermined standard value.

According to the present aspect, the opening degrees of the regulating valves are controlled on the basis of a result of direct detection of the activity level of the biofilm of the filter by the activity-level detecting part, and thereby it is possible to control the supply amount of seawater to each filter via the bypass tube appropriately.

The activity-level detecting part may be configured to detect the activity level on the basis of a difference in oxygen concentration between an inlet section and an outlet section of the at least one filter. In this case, the activity level of the biofilm may be detected on the basis of a difference in oxygen concentration between an inlet section and an outlet section of the filter.

To achieve the above object, a method of pretreating seawater to be supplied to a device for removing salt from the seawater or concentrating the seawater by membrane filtration, with a plurality of filters connected to one another in series and including a particulate filtering material for separating particles and a biofilm formed on a surface of the particulate filtering material, according to at least one aspect of the present invention, comprises: detecting water quality at an outlet section of at least one of the plurality of filters: and supplying seawater directly to each of the plurality of filters on the basis of the detected water quality.

The method according to this aspect can be preferably performed by the above described pretreatment device of seawater (including the above aspects).

Advantageous Effects

According to the present invention, each of the plurality of filters connected in series to one another is connected to the supply duct via the bypass tube, and thereby it is possible to supply each filter with seawater containing sufficient nutrients in accordance with the opening degrees of the regulating valves. Thus, it is possible to grow and maintain the biofilm in a good state even for the filter on the downstream side, where nutrients are likely to fall short.

DETAILED DESCRIPTION

Embodiments of the present invention will now be described in detail. Embodiments described below are not intended to unnecessarily limit the present invention defined in the following claims, and not all of configurations described in the embodiments are required in the solution of the present invention.

(First Embodiment)

Figure 1:
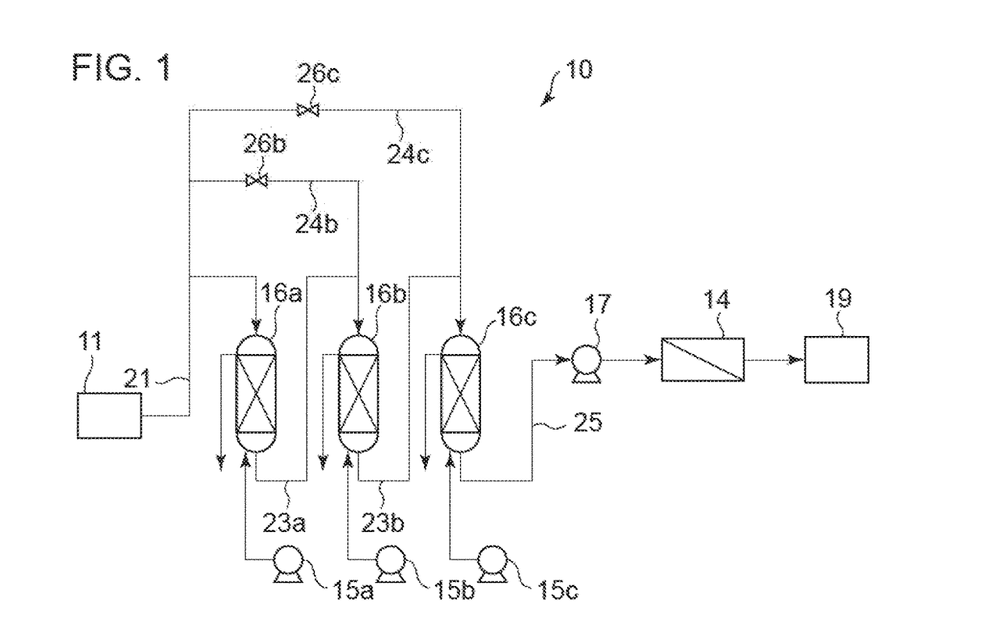
FIG. 1 is a configuration diagram of a seawater desalination system including a pretreatment device of seawater according to the first embodiment.

FIG. 1 is a configuration diagram of a seawater desalination system including a pretreatment device 10 of seawater according to the first embodiment.

The seawater desalination system processes seawater stored in a supply-water tank 11 with the pretreatment device 10 to remove particles in seawater, SDI components which may foul a membrane surface, BOD components which may cause biofouling, and the like, and then removes salt from the seawater with a reverse osmosis membrane 14 to produce fresh water. While the present embodiment describes the reverse osmosis membrane 14 as an example of an approach to remove salt, an NF membrane, an electrodialytic membrane, or the like may be used instead.

The pretreatment device 10 includes three sand filters 16 having the same configuration (hereinafter, characters 'a', 'b', and 'c' will be suffixed when distinctively referring to respective sand filters and corresponding parts). Each sand filter 16 includes sand 18 serving as a particulate filtering material for removing particles from seawater, and a biofilm 20 formed on the surface of the sand 18 to remove SDI components and BOD components.

The pretreatment device 12 includes a supply duct 21 for supplying the sand filters 16 with seawater stored in the supply-water tank 11. Oxygen in seawater flowing through the supply duct 21 grows and maintains the biofilms 20 of the sand filters 16.

Three sand filters 16a, 16b, 16c are disposed in series from the upstream side in this order, and connected to one another via connecting tubes 23a and 23b. The sand filter 16c disposed most downstream is connected to an outlet duct 25, and a high-pressure pump 17 disposed in the outlet duct 25 feeds seawater to the electrodialytic membrane 14 to obtain freshwater. The freshwater obtained accordingly is stored in a brine tank 19.

Each sand filter 16 is equipped with a back-cleaning pump 15 which performs reverse-current cleaning for refreshing in case of deterioration of filtering performance. While three sand filter 16 are connected in series in the present embodiment, the following technical idea can be also applied to pretreatment devices with a different number of sand filters or with different connection arrangement.

The sand filters 16b and 16c are provided with a plurality of bypass tubes 24b and 24c for bypass connection to the supply duct 21. The bypass tubes 24b and 24c include regulating valves 26b and 26c with adjustable opening degrees, and the opening degrees are manually adjustable. Accordingly, it is possible to supply the sand filters 16b and 16c on the downstream side with nutritious seawater directly from the supply duct 21 via the bypass tubes 24b and 24c, which makes it possible to make up effectively for shortage of nutrients which is likely to occur in the sand filters 16b and 16c on the downstream side due to consumption of nutrients by the sand filter 16a on the upstream side, and to grow and maintain the biofilm 20 of each sand filter 16 in a good state.

The opening degrees of the regulating valves 26 may be adjusted suitably taking account of the amount of nutrients contained in seawater supplied to the sand filters 16 and the water quality of seawater discharged from the sand filters 16. More preferably, the opening degrees of the regulating valves 26 may be adjusted according to examples of electronic control described in the second and subsequent embodiments.

As described above, according to the present embodiment, the sand filters 16b and 16c are supplied with seawater directly from the supply duct 21 via the bypass tubes 24b and 24c, and thereby it is possible to feed each sand filter 16 with sufficient nutrients and to grow and maintain the biofilms 20 in a good state.

(Second Embodiment)

Figure 2:
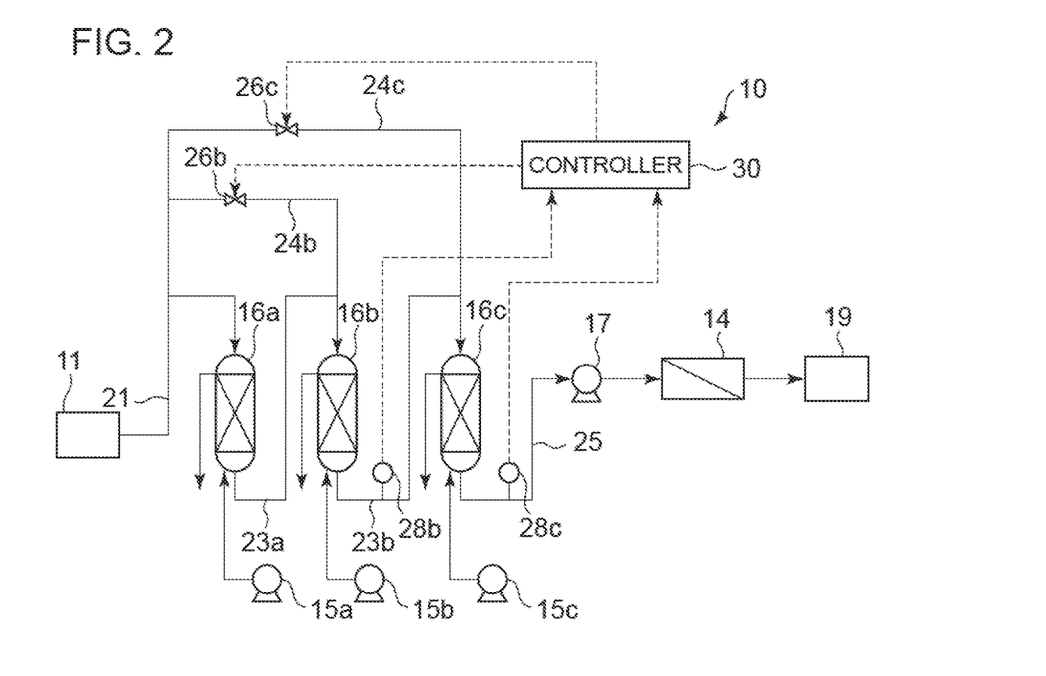
FIG. 2 is an overall configuration diagram of a seawater desalination system including a pretreatment device of seawater according to the second embodiment.

FIG. 2 is an overall configuration diagram of a seawater desalination system including a pretreatment device 10 of seawater according to the second embodiment. In the present embodiment, the same features in the above embodiment are associated with the same reference numerals, and not described again unless otherwise required.

The pretreatment device 10 is different from the above embodiment in that the pretreatment device 10 includes water-quality detecting sensors 28, and a controller 30 for electronically controlling the opening degrees of the regulating valves 26 on the basis of detection values obtained by the water-quality detecting sensors 28. The water-quality detecting sensors 28 are disposed on the outlet sections of the sand filters 16b and 26c, and capable of detecting the water quality of seawater processed by the sand filters 16b and 16c, respectively. While the water-quality detecting sensors 28 in the present embodiment are SDI meters which detect an SDI value as an example of a water quality index, a device which detects another water-quality index may be employed.

Figure 3:
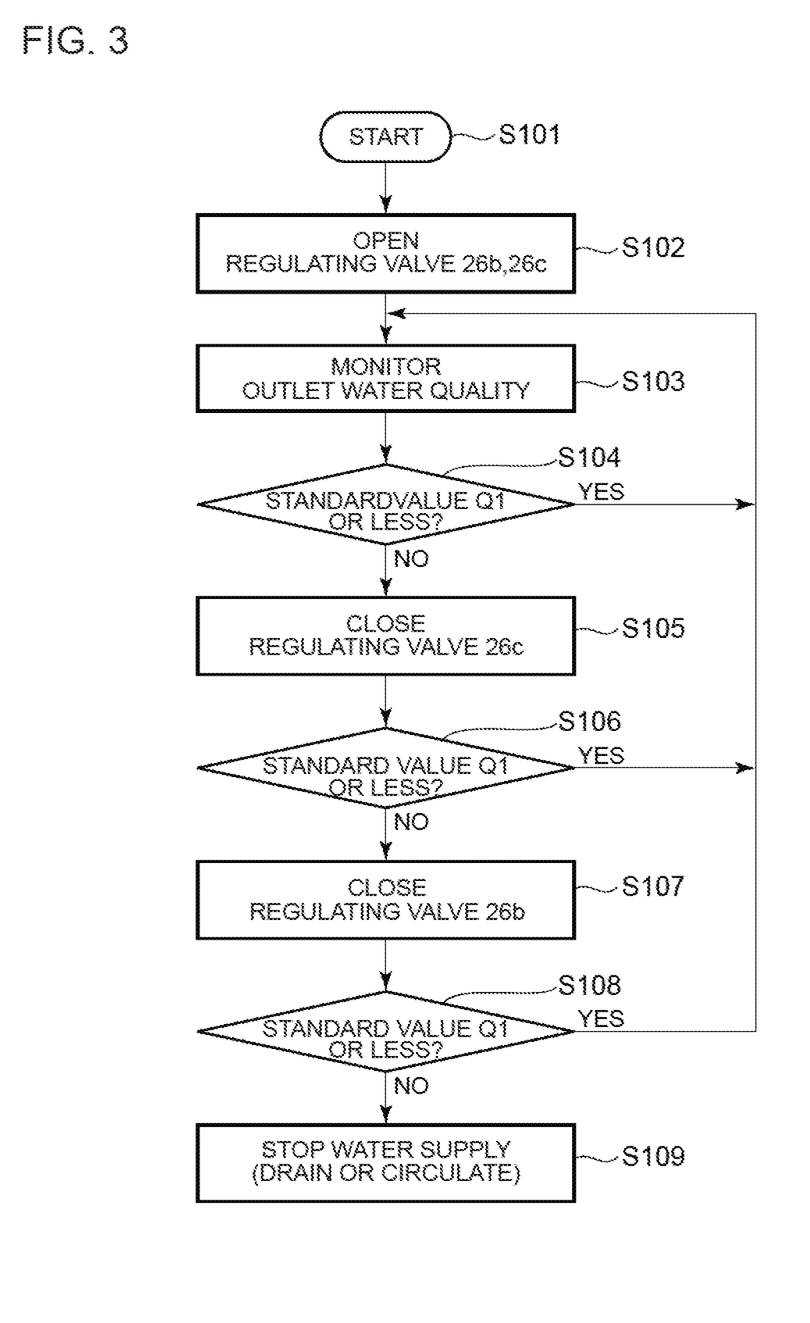
FIG. 3 is a flowchart of a method of controlling the pretreatment device of seawater according to the second embodiment.

FIG. 3 is a flowchart of a method of controlling the pretreatment device of seawater according to the second embodiment.

Operation of the pretreatment device 10 is started (step S101), and then the controller 30 opens the regulating valves 26b and 26c to supply the sand filters 16b and 16c with water via the bypass tubes 24b and 24c, thereby feeding the sand filters 16b and 16c with nutritious seawater (step S102). Accordingly, the sand filters 16b and 16c on the downstream side are also supplied with sufficient nutrients required by a biofilm.

On the other hand, seawater supplied through the bypass tubes 24 is seawater that has not yet flowed through the sand filters 16, and thus excessive supply of such seawater may bring about deterioration of water quality. In this regard, the controller 30 monitors the water quality of seawater discharged from the sand filter 16c on the basis of a detection value obtained by the water-quality detecting sensor 28c (step S103), and determines whether the detection value is not greater than the first standard value Q1 set in advance (S104). As a result of the determination, if the detection value is not greater than the first standard value Q1 (step S104: YES), the controller 30 determines that there is no deterioration of water quality due to water supply through the bypass tubes 24, and returns the process to step 103 to maintain the status quo.

On the other hand, if the detection value is greater than the first standard value Q1 (step S104: NO), the controller 30 determines that there is deterioration of water quality due to water supply through the bypass tubes 24, and closes the regulating valve 26c corresponding to the sand filter 16c at the most downstream position (step S105). The sand filter 16c at the most downstream position has the greatest influence on water quality of water finally discharged from the pretreatment device 12, and thus at this stage it is possible to prevent deterioration of water quality of seawater discharged from the pretreatment device 10 quickly and effectively by closing the regulating valve 26c.

Next, similarly to step S104, the controller 30 determines whether the detection value obtained by the water-quality detecting sensor 28c is not greater than the first standard value Q1 (step S106). As a result of the determination, if the detection value is not greater than the first standard value Q1 (step S106: YES), the controller 30 determines that there is no deterioration of water quality due to water supply through the bypass tubes 24, and returns the process to step S103 to maintain the status quo.

On the other hand, if the detection value is greater than the first standard value Q1 (step S106: NO), the controller 30 determines that there is deterioration of water quality due to water supply through the bypass tubes 24, and closes the regulating valve 26b, which is next upstream of the regulating valve 26c closed in step S105 (step S107). The sand filter 16b is disposed on the next most downstream position after the sand filter 16c, and thus has next largest influence on water quality of water discharged from the pretreatment device 12 after the sand filter 16c. Therefore, if deterioration of water quality continues to be detected even after closure of the regulating valve 26c corresponding to the sand filter 16c disposed on the most downstream position, it is possible to prevent further deterioration of water quality by closing the regulating valve 26b as well.

Next, similarly to steps S104 and S106, the controller 30 determines whether the detection value of the water-quality detecting sensor 28c is not greater than the first standard value Q1 (step S108). As a result of the determination, if the detection value is not greater than the first standard value Q1 (step S108: YES), the controller 30 determines that there is no deterioration of water quality due to water supply through the bypass tubes 24, and returns the process to step S103 to maintain the status quo.

On the other hand, if the detection value is greater than the first standard value Q1 (step S108: NO), the controller 30 determines that there is still deterioration of water quality due to water supply through the bypass tubes 24, and stops water supply (step S109). In this case, besides stopping water supply, the back-cleaning pumps 15 may automatically refresh the respective sand filters 16 to recover water quality.

While the opening degrees of the regulating valves 26 are controlled on the basis of a detection value of the water-quality detecting sensor 28c in the present embodiment, opening degrees may be controlled in accordance with a similar idea in response to a result of evaluation on filtering performance of the sand filter 16b in the middle position evaluated on the basis of a detection value of the water-quality detecting sensor 28b.

As described above, according to the present embodiment, the opening degrees of the respective regulating valves 26 are controlled on the basis of water quality of seawater discharged from the sand filter 16, and thereby it is possible to supply nutrients to each sand filter 16 while maintaining water quality.

(Third Embodiment)

Figure 4:
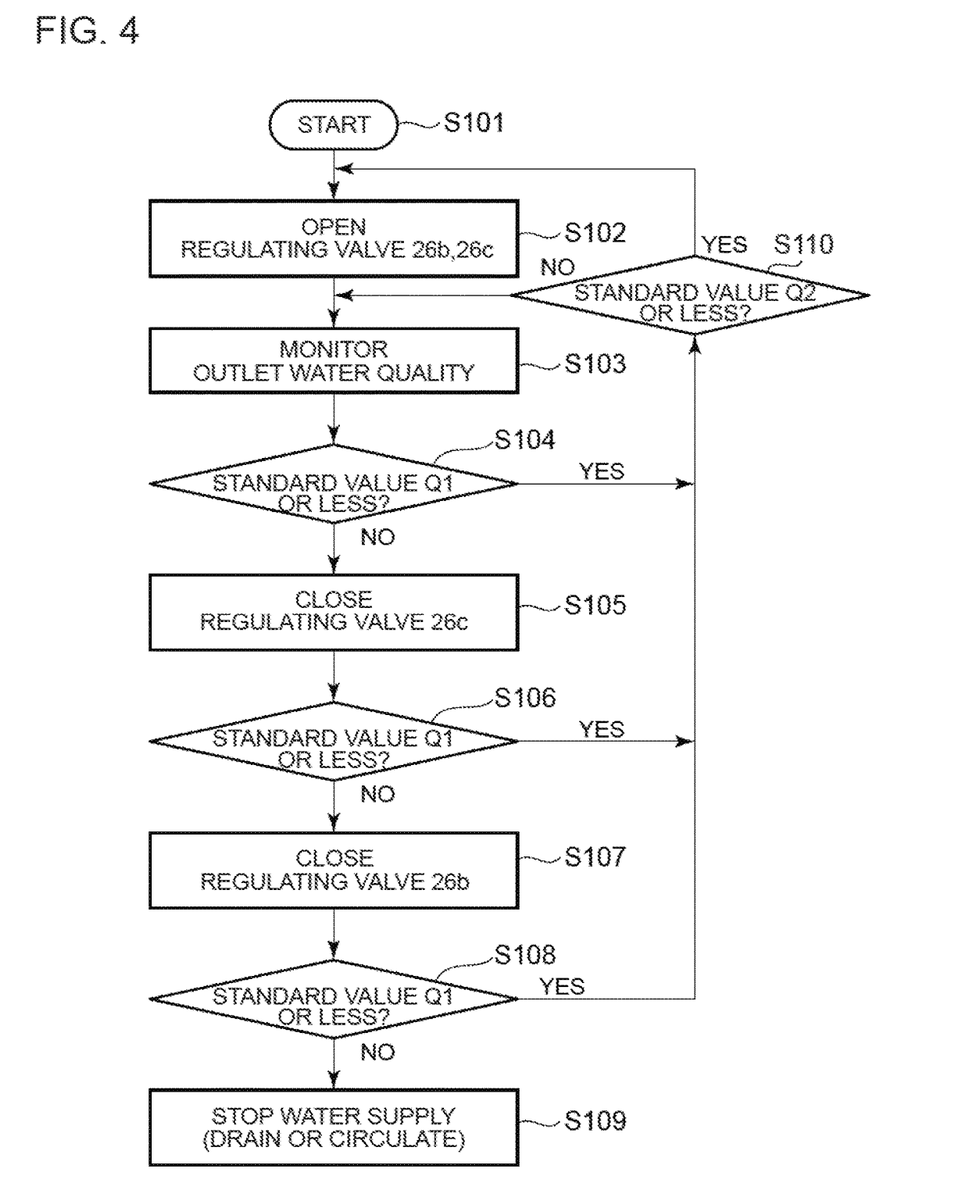
FIG. 4 is a flowchart of a method of controlling the pretreatment device of seawater according to the third embodiment.

FIG. 4 is a flowchart of a method of controlling the pretreatment device 10 of seawater according to the third embodiment.

The seawater filtering device according to the present embodiment has a similar hardware configuration to that of the second embodiment, and thus the common steps are associated with the same reference numerals in FIG. 4 and not described again.

The control method of the present embodiment is fundamentally similar to that of the second embodiment, except that, if a detection value of water quality is determined to be greater than the first standard value Q1 in steps S104, S106, and S108, the controller 30 further determines whether the detection value of the water-quality detecting sensor 28c is not greater than the second standard value Q2, which is set to be smaller than the first standard value Q1 (step S110). If water quality SDI is not greater than the second standard value Q2 (step S110: YES), the controller 30 determines that water quality has recovered as a result of the above described control on the regulating valves 26, and returns the process to step S102, thereby automatically restarting water supply to the sand filters 16b and 16c via the bypass tubes 24b and 24c. As described above, if it is confirmed that deterioration of water quality has been recovered by dosing the regulating valves 26, the regulating valves 26b and 26c are controlled to open again, and thereby it is possible to restart supply of nutritious seawater through the bypass tubes 24b and 24c.

On the other hand, if water quality SDI is greater than the second standard value Q2 (step S110: NO), the controller 30 determines that water quality has not been sufficiently recovered by the above control on the regulating valves 26, and returns the process to step S103.

As described above, according to the present embodiment, recovery of water quality is confirmed and the regulating valves 26 are controlled to open automatically after closure of the regulating valves 26 for preventing deterioration of water quality, and thereby it is possible to perform restoration automatically.

(Fourth Embodiment)

Figure 5:
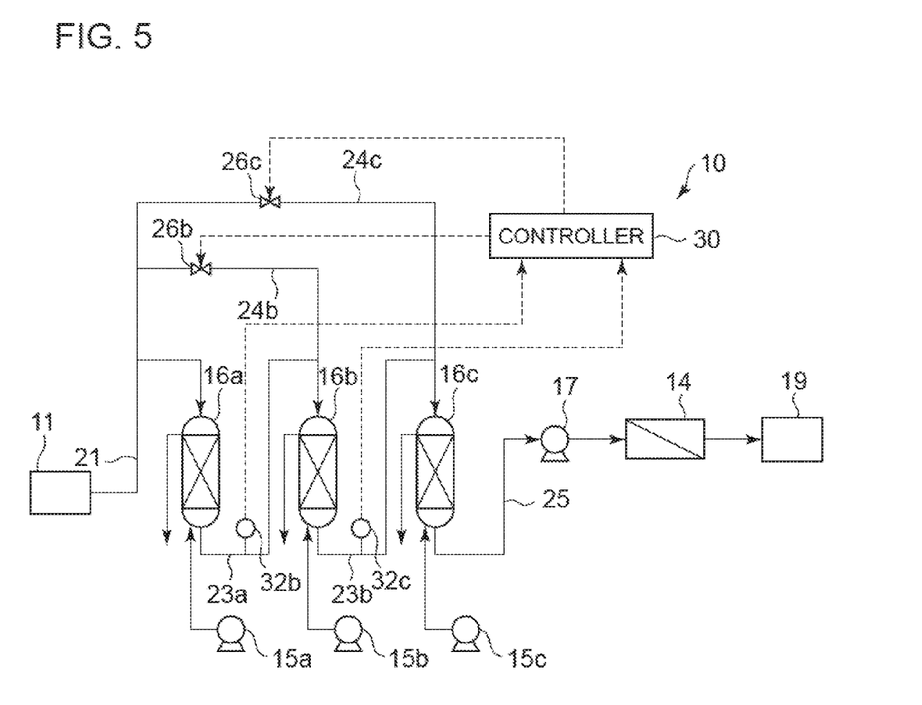
FIG. 5 is an overall configuration diagram of a seawater desalination system including a pretreatment device of seawater according to the fourth embodiment.

FIG. 5 is an overall configuration diagram of a seawater desalination system including the pretreatment device 10 of seawater according to the fourth embodiment. In the present embodiment, the same features in the above embodiments are associated with the same reference numerals, and not described again unless otherwise required.

The pretreatment device 10 is different from the above embodiments in that the pretreatment device 10 includes nutrient detecting sensors 32, and a controller 30 for electronically controlling the opening degrees of the regulating valves 26 on the basis of detection values obtained by the nutrient detecting sensors 32. The nutrient detecting sensors 32b and 32c are disposed on the inlet sections of the sand filters 16b and 16c, to detect nutrients contained in seawater supplied to the sand filters 16b and 16c. While the nutrient detecting sensors 32 detect carbon (C), nitrogen (N), and phosphorus (P) as nutrients in the present embodiment, a device which detects another nutrient may be employed.

Figure 6:
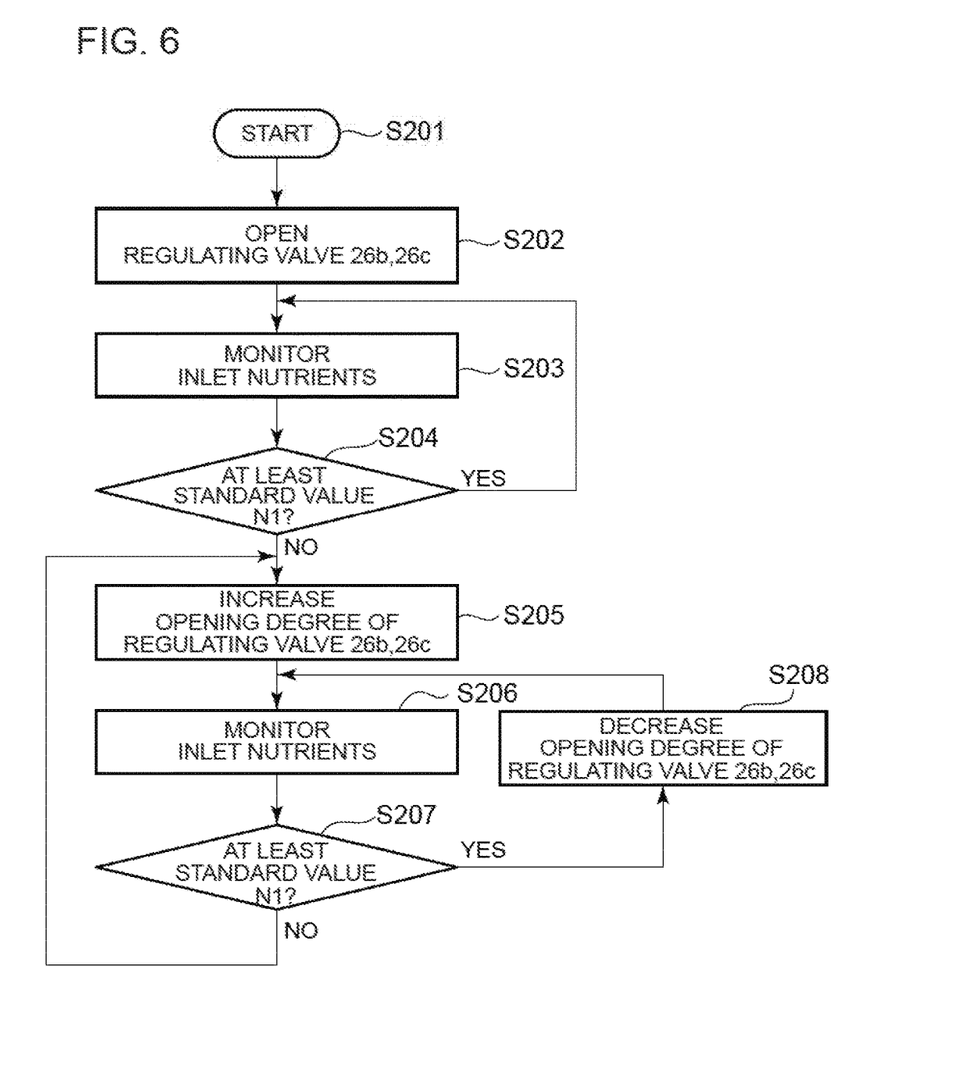
FIG. 6 is a flowchart of a method of controlling the pretreatment device of seawater according to the fourth embodiment.

FIG. 6 is a flowchart of a method of controlling the pretreatment device 10 according to the fourth embodiment.

Operation of the pretreatment device 10 is started (step S201), and then the controller 30 opens the regulating valves 26b and 26c to a preset opening degree, thereby feeding the sand filters 16b and 16c with seawater through the bypass tubes 24b and 24c (step S202).

The nutrient detecting sensors 32b and 32c detect nutrients contained in the seawater supplied to the sand filters 16b and 16c at the inlet sections (step S203), and the controller 30 determines whether detection results of the nutrient detecting sensors 32b and 32c are at least a standard value N1 set in advance (step S204). If the detection values obtained by the nutrient detecting sensors 32b and 32c are at least the standard value N1 (step S204: YES), it means that the sand filters 16*b* and 16*c* contain sufficient nutrients, and the controller 30 returns the process to step S203, and maintains the status quo.

On the other hand, if detection values obtained by the nutrient detecting sensors 32*b* and 32*c* are less than the standard value N1 (step S204: NO), the controller 30 increases the opening degrees of the regulating valves 26*b* and 26*c* (step S205). In this case, nutrients are below the standard value N1, and a supply amount through the bypass tubes 24 is increased by raising the valve opening degrees to make up for insufficient nutrients. More preferably, individual control amounts may be set for the opening degrees of the regulating valves 26*b* and 26*c* on the basis of detection values of the nutrient detecting sensors 32*b* and 32*c*, respectively.

Next, similarly to step S203, the nutrient detecting sensors 32*b* and 32*c* detect nutrients contained in seawater supplied to the sand filters 16*b* and 16*c* (step S206), and the controller 30 determines again whether detection values of the nutrient detecting sensors 32*b* and 32*c* are at least the standard value N1 (step S207). As a result of the determination, if a detection value is at least the standard value N1 (step S207: YES), the controller 30 reduces the opening degree of the corresponding regulating valve 26, thereby preventing deterioration of water quality due to excessive water supply through the bypass tube 24 (step S208). On the other hand, if the detection values obtained by the nutrient detecting sensors 32 are less than the standard value N1 (step S207: NO), the controller 30 returns the process to step 205.

While the nutrient detecting sensors 32*b* and 32*c* are disposed on the inlet sections of the sand filters 16*b* and 16*c* in the above description, alternatively, the nutrient detecting sensors 32*b* and 32*c* may be disposed on the outlet sections of the sand filters 16*a* and 16*b*.

As described above, according to the present embodiment, nutrients supplied to each sand filter 16 are detected and the opening degrees of the regulating valves 26 are controlled in accordance with the sufficiency of the nutrients, and thereby it is possible to feed each sand filter 16 with nutrients while preventing deterioration of water quality, to achieve excellent performance.

(Fifth Embodiment)

Figure 7:
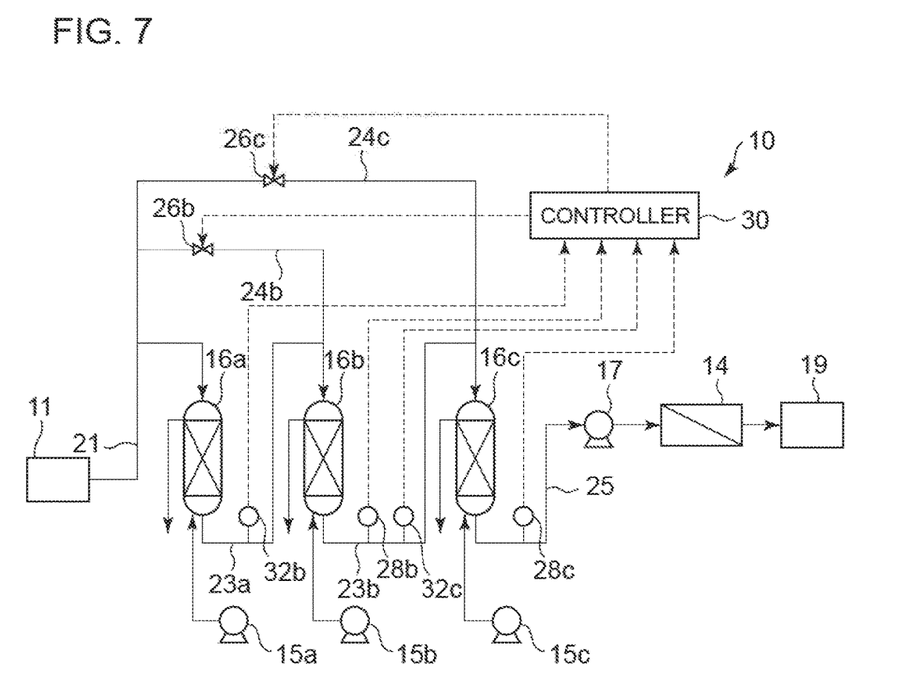
FIG. 7 is an overall configuration diagram of a seawater desalination system including a pretreatment device of seawater according to the fifth embodiment.

FIG. 7 is an overall configuration diagram of a seawater desalination system including a pretreatment device 10 of seawater according to the fifth embodiment. The pretreatment device 10 according to the present embodiment includes both of the above described water-quality detecting sensors 28 and the nutrient detecting sensors 32, and the controller 30 performs various controls on the basis of detection values obtained by the sensors of both types.

In the present embodiment, the same features in the above embodiments are associated with the same reference numerals, and not described again unless otherwise required.

Figure 8:
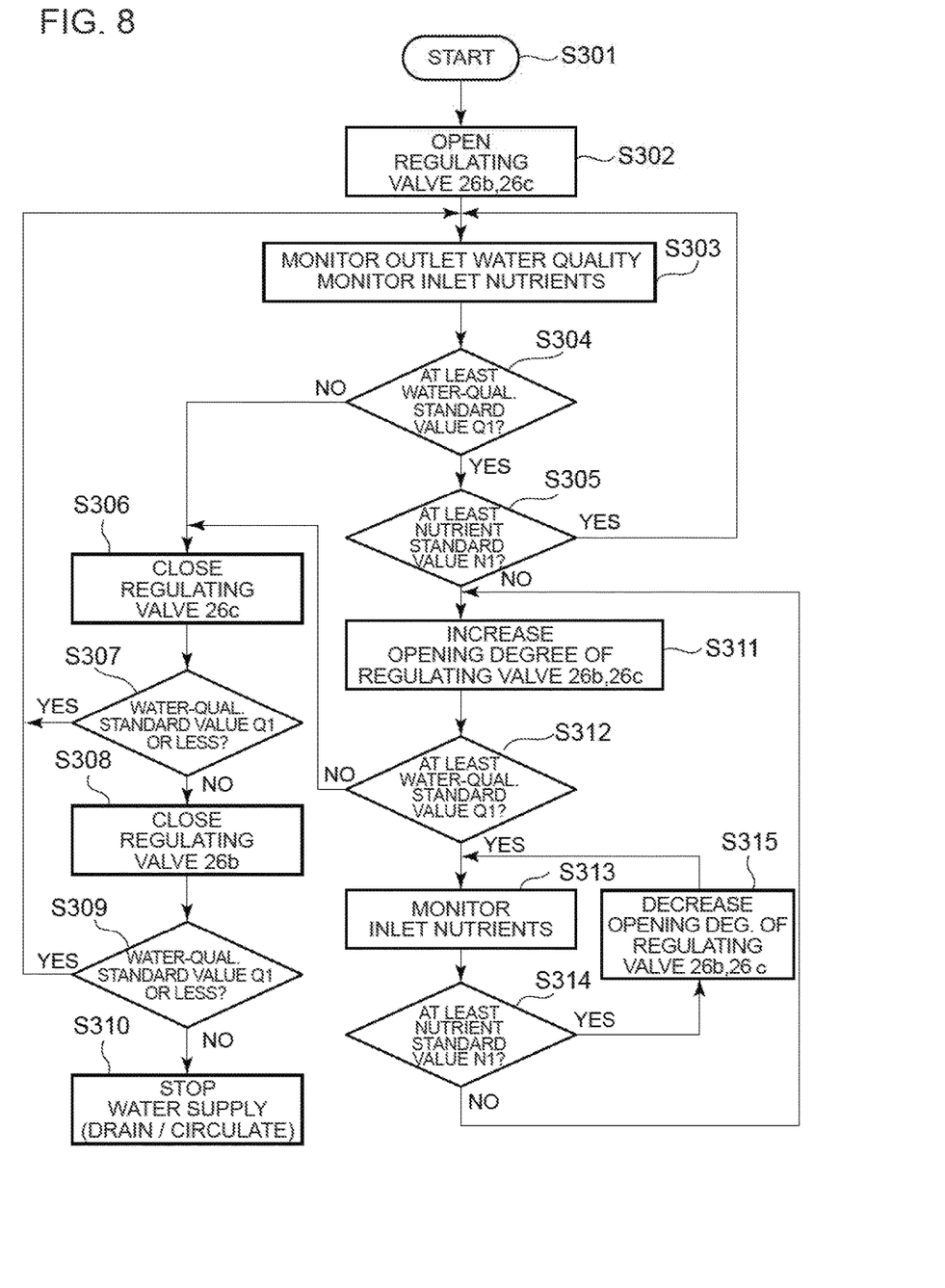
FIG. 8 is a flowchart of a method of controlling the pretreatment device of seawater according to the fifth embodiment.

FIG. 8 is a flowchart of a method of controlling the pretreatment device 10 of seawater according to the fifth embodiment.

Operation of the pretreatment device 10 is started (step S301), and the regulating valves 26*b* and 26*c* are controlled to open to a predetermined opening degree, and thereby the sand filters 16*b* and 16*c* are fed with seawater containing nutrients through the bypass tubes 24*b* and 24*c* (step S302).

Next, the water-quality detecting sensor 28*c* detects water quality at the outlet section of the sand filter 16*c* at the most downstream position, while the nutrient detecting sensors 32 detect nutrients of the inlet sections of the respective sand filters 16 (step S303), and detection values are compared with a corresponding standard value (step S304 and S305). If water quality is less than the standard value Q1 (step S304: NO), the controller 30 closes the regulating valve 26*c* on the most downstream position (step S306), and then detects water quality again and compares the water quality with the standard value Q1 (step S307). If the water quality is greater than the standard value Q1 (step S307: NO), the controller 30 closes the regulating valve 26*b* next upstream to the regulating valve 26*c* (step S308), and determines again whether water quality is not greater than the standard value Q1 (step S309). As a result of the determination, if the water quality is not greater than the standard value Q1 (step S309: NO), the controller 30 returns the process to step 303. On the other hand, if the water quality is greater than the standard value Q1 (step S309: NO), the controller 30 stops water supply (step S3010).

Subsequently, if the water quality is at least the standard value (step S304: YES), the controller 30 further determines whether nutrients are at least the standard value N1 (step S305). As a result of the determination, if the nutrients are at least the standard value (step S305: YES), the controller 30 returns the process to step S303 and repeats the above process. On the other hand, if the nutrients are less than the standard value N1 (step S305: NO), the controller 30 adjusts the opening degree of each regulating valve 26 to increase (step S311), and increases a supply amount of seawater through the bypass tubes 24. Accordingly, it is possible to supply the sand filters 16*b* and 16*c* with nutrients to make up for shortage.

Further, the controller 30 again determines whether water quality is at least the standard value Q1 (step S312). As a result of the determination, if the water quality is less than the standard value Q1 (step S312: NO), the controller 30 advances the process to step S306 and then proceeds with the above described process. On the other hand, if the water quality is at least the standard value Q1 (step 312: YES), the controller 30 performs detection with the nutrient detecting sensors 32*b* and 32*c* (step S313), and determines again if the detection values of the nutrient detecting sensors 32*b* and 32*c* are at least the standard value N1 (step S314). As a result of the determination, if detection values are at least the standard value N1 (step S314: YES), the controller 30 reduces the opening degrees of the respective regulating valves 26*b* and 26*c*, thereby preventing excessive supply of seawater through the bypass tubes 24 (step S314). On the other hand, if the detection values are less than the standard value N1 (step S312: NO), the controller 30 returns the process to step 311 and repeats the above process.

As describe above, water quality and nutrients are both detected in the present embodiments, which makes it possible to supply each sand filter with sufficient nutrients to an extent that does not bring about deterioration of water quality, and to achieve excellent performance.

(Sixth Embodiment)

Figure 9:
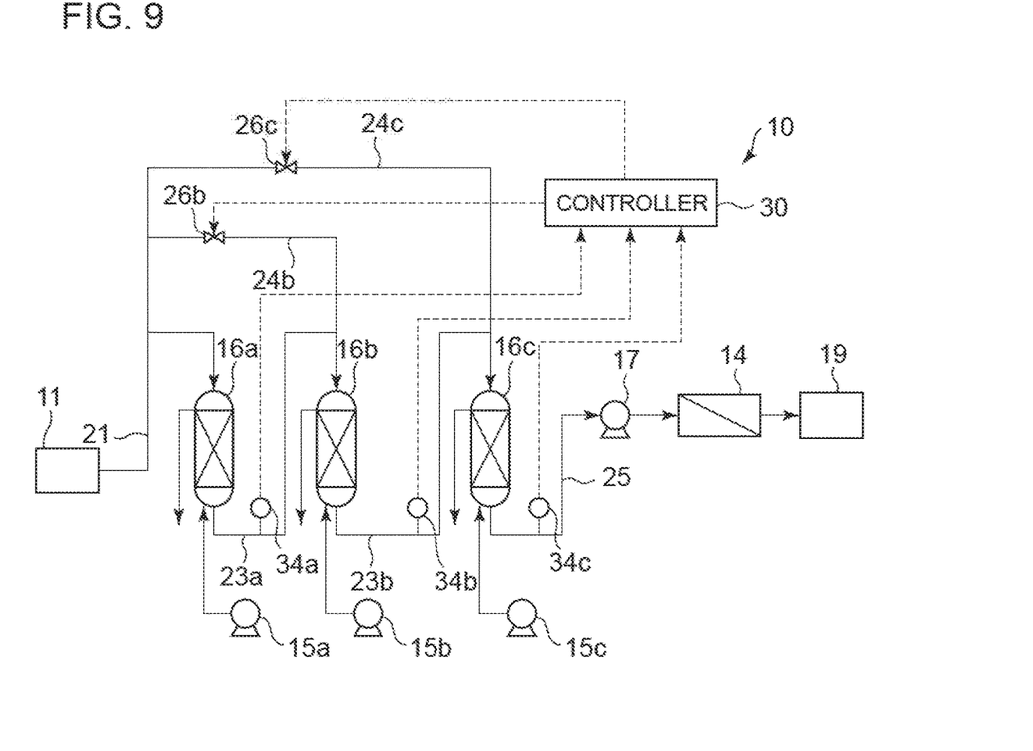
FIG. 9 is an overall configuration diagram of a seawater desalination system including a pretreatment device of seawater according to the sixth embodiment.

FIG. 9 is an overall configuration diagram of a seawater desalination system including a pretreatment device 10 of seawater according to the sixth embodiment. While the opening degrees of the regulating valves are controlled on the basis of water quality or nutrients in the above embodiments, the present embodiment is characterized in that the opening degrees of the regulating valves 26 are controlled on the basis of the activity level of each sand filter 16.

It will be understood that the present embodiment can be combined with the above described opening-degree controls for the regulating valves based on water quality and nutrients.

In the present embodiment, a plurality of oxygen-concentration sensors 34a, 34b6, 34c is provided to evaluate the activity level of each of the sand filters 16b and 16c. The oxygen-concentration sensors 34a, 34b, 34c are disposed on the inlet sections and the outlet sections of the sand filters 16b and 16c (in FIG. 9 in particular, the outlet section of the sand filter 16b also serves as the inlet section of the sand filter 16c and is provided with one oxygen concentration sensor). The controller 30 obtains a difference between detection values of the inlet section and the outlet section for each of the sand filters 16b and 16c on the basis of the oxygen-concentration sensors 34a, 34b, 34c, thereby calculating an amount of oxygen consumption by microbes in each of the sand filters 16b and 16c to obtain an activity level.

Figure 10:
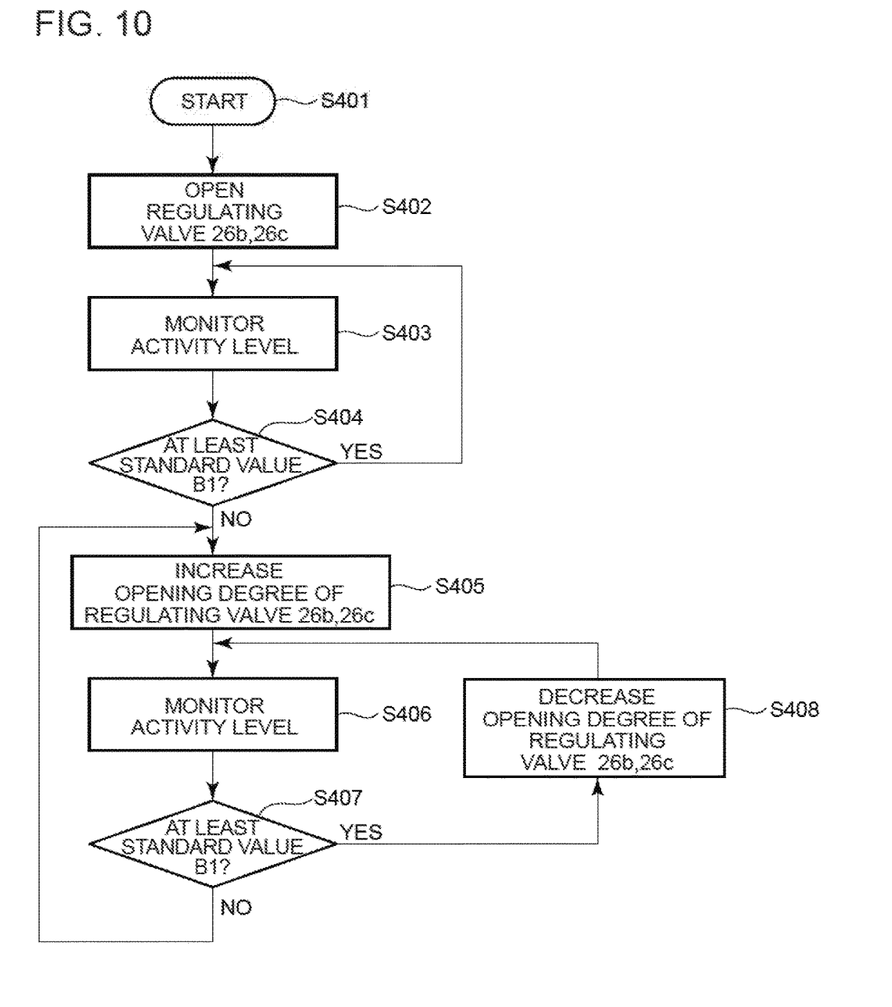
FIG. 10 is a flowchart of a method of controlling the pretreatment device according to the sixth embodiment.

FIG. 10 is a flowchart of a method of controlling the pretreatment device 10 according to the sixth embodiment.

The controller 30 starts operation of the pretreatment device 10 (step S401), and controls the respective opening degrees of the regulating valves 26b and 26c to a predetermined opening degree (step S402). Accordingly, the sand filters 16b and 16c are supplied with seawater containing nutrients from the supply duct 21 through the bypass tubes 24b and 24c, respectively. Subsequently, the controller 30 detects the activity levels of the respective sand filters 16b and 16c from detection values of the oxygen-concentration sensors 34a, 34b, 34c according to the above method (step S403).

Further, the controller 30 determines whether the activity levels of the sand filters 16b and 16c are at least the standard value B1 set in advance (step S404). If the activity levels are at least the standard value B1 (step S404: YES), the controller 30 determines that sufficient nutrients are supplied to the sand filters 16 via the bypass tubes 24, and returns the process to step S403 to maintain the status quo. On the other hand, if the activity levels are less than the standard value B1 (step S404: NO), the controller 30 determines that there is deterioration of the activity levels due to shortage of nutrients in the sand filters 16b and 16c, and increases the respective opening degrees of the regulating valves 26b and 26c (step S405). Accordingly, it is possible to increase a supply amount of seawater supplied through the bypass tubes 24b and 24c, and make up for shortage of nutrients.

Subsequently, similarly to step S404, the controller 30 detects again the respective activity levels of the sand filters 16b and 16c (step S406), and compares the activity levels to the standard value B1 (step S407). As a result of the determination, if the activity levels are at least the standard value B1 (step S407: YES), the controller 30 determines that excessive nutrients are supplied to the sand filters 16b and 16c, and decreases the respective opening degrees of the regulating valves 26b and 26c (step S408). Accordingly, it is possible to appropriately regulate amounts of seawater respectively supplied to the sand filters 16b and 16c through the bypass tubes 24b and 24c to prevent deterioration of water quality due to excessive supply.

On the other hand, if the activity levels are less than the standard value B1 (step S407: NO), the controller 30 returns the process to step S405 and repeats the above process.

As described above, according to the present embodiment, an activity level of each sand filter 16 is directly evaluated, and thereby it is possible to supply the sand filters with seawater containing nutrients through the bypass tubes in just the right amount to achieve excellent filtering performance.

INDUSTRIAL APPLICABILITY

The present invention is related to a technical field of a pretreatment device of seawater to be supplied to a device which removes salt from seawater or concentrates salt in seawater by membrane filtration to produce fresh water.

DESCRIPTION OF REFERENCE NUMERALS

10 Pretreatment device
11 Supply-water tank
14 Electrodialytic membrane
Back-cleaning pump
16 Sand filter
17 High-pressure pump
19 Brine tank
21 Supply duct
24 Bypass tube
26 Regulating valve
28 Water-quality detecting sensor
30 Controller
32 Nutrient detecting sensor
34 Oxygen concentration sensor

The invention claimed is:

1. A pretreatment device of seawater to be supplied to a device for removing salt from the seawater or concentrating the seawater by membrane filtration, the pretreatment device comprising:
a supply duct through which the seawater is to be supplied;
a plurality of filters including a particulate filtering material which separates particles from the seawater supplied through the supply duct, and a biofilm formed on a surface of the particulate filtering material;
a plurality of connecting tubes which connect the plurality of filters in series;
a plurality of bypass tubes each of which connects corresponding one of the plurality of filters to the supply duct; and
a plurality of regulating valves each of which is disposed in corresponding one of the plurality of bypass tubes to regulate a flow rate,
a water-quality detecting part disposed on an outlet section of at least one of the plurality of filters; and
a valve control part configured to control opening degrees of the regulating valves on the basis of a detection value obtained by the water-quality detecting part,
wherein the valve control part controls the opening degrees of the regulating valves to be reduced on the basis of a detection value obtained by the water-quality detecting part after the valve control part controls each of the plurality of regulating valves to be open.

2. The pretreatment device of seawater according to claim 1,
wherein the water-quality detecting part is disposed on the outlet section of the filter disposed most downstream among the plurality of filters, and
wherein the valve control part is configured to control the plurality of regulating valves to be closed in order from a downstream side, if the detection value obtained by the water-quality detecting part is greater than a first standard value set in advance after the valve control part controls the plurality of regulating valves to be open.

3. The pretreatment device of seawater according to claim 2,
wherein the valve control part is configured to control the plurality of regulating valves to be open, if the detection value obtained by the water-quality detecting part is not greater than a second standard value set in advance, the second standard value being smaller than the first standard value, after the valve control part controls the plurality of regulating valves to be closed.

4. A pretreatment device of seawater to be supplied to a device for removing salt from the seawater or concentrating the seawater by membrane filtration, the pretreatment device comprising:
   a supply duct through which the seawater is to be supplied;
   a plurality of filters including a particulate filtering material which separates particles from the seawater supplied through the supply duct, and a biofilm formed on a surface of the particulate filtering material;
a plurality of connecting tubes which connect the plurality of filters in series;
   a plurality of bypass tubes each of which connects corresponding one of the plurality of filters to the supply duct;
   a plurality of regulating valves each of which is disposed in corresponding one of the plurality of bypass tubes to regulate a flow rate,
   a nutrient detecting part configured to detect nutrients contained in supply water to be supplied to at least one of the plurality of filters; and
   a valve control part configured to control opening degrees of the regulating valves
   wherein the valve control part controls the opening degrees of the regulating valves on the basis of the detection value obtained by the nutrient detecting part after the valve control part controls the plurality of regulating valves to be open.

5. The pretreatment device of seawater according to claim 4,
   wherein the nutrient detecting part is disposed on an inlet section of the plurality of filters, and
   wherein the valve control part is configured to control the opening degrees of the regulating valves so that a detection value of the nutrient detecting part is at least a predetermined standard value.

6. A pretreatment device of seawater to be supplied to a device for removing salt from the seawater or concentrating the seawater by membrane filtration, the pretreatment device comprising:
   a supply duct through which the seawater is to be supplied;
   a plurality of filters including a particulate filtering material which separates particles from the seawater supplied through the supply duct, and a biofilm formed on a surface of the particulate filtering material;
   a plurality of connecting tubes which connects the plurality of filters in series;
   a plurality of bypass tubes each of which connects corresponding one of the plurality of filters to the supply duct;
   a plurality of regulating valves each of which is disposed in corresponding one of the plurality of bypass tubes to regulate a flow rate,
   an activity-level detecting part disposed on at least one of the plurality of filters, and configured to detect an activity level of the biofilm of the at least one filter, and
   a valve control part configured to control opening degrees of the regulating valves,
   wherein the valve control part is configured to control the opening degrees of the regulating valves so that the detection value obtained by the activity-level detecting part is at least a predetermined standard value after the valve control part controls the plurality of regulating valves to be open.

7. The pretreatment device of seawater according to claim 6,
   wherein the activity-level detecting part is configured to detect the activity level on the basis of a difference in oxygen concentration between an inlet section and an outlet section of the at least one filter.

8. A method of pretreating seawater to be supplied to a device for removing salt from the seawater or concentrating the seawater by membrane filtration by using a pretreatment device, the pretreatment device comprising:
   a supply duct through which the seawater is to be supplied;
   a plurality of filters including a particulate filtering material which separates particles from the seawater supplied through the supply duct, and a biofilm formed on a surface of the particulate filtering material;
   a plurality of connecting tubes which connect the plurality of filters in series;
   a plurality of bypass tubes each of which connects corresponding one of the plurality of filters to the supply duct;
a plurality of regulating valves each of which is disposed in corresponding one of the plurality of bypass tubes to regulate a flow rate,
the method comprising:
   setting each of the plurality of regulating valves to be open;
   detecting water quality at an outlet section of at least one of the plurality of filters; and
   controlling the opening degrees of the regulating valves to be reduced on the basis of the detected water quality.

* * * * *